Patented Aug. 1, 1939

2,168,156

UNITED STATES PATENT OFFICE 2,168,156

CAPACITOR COMPOSITION

Frank M. Clark, Pittsfield, Mass., assignor to General Electric Company, a corporation of New York No Drawing. Application July 30, 1938, Serial No. 222,300

7 Claims. (Cl. 175—315)

The present invention relates to electric capacitors and similar capacitance devices, and in particular to electrolytic compositions which are used in such devices. Its object is to improve the electrical stability of such devices.

Electric capacitors are increasingly used as a cooperative element for electrical devices, such as motors, for example, which requires substantially constant characteristics of capacity and power factor in order to obtain good results. Capacitors also frequently are mechanically mounted upon or so associated with motors or other devices that they partake of the operating temperature of such devices. High temperatures, that is, temperatures as high as 100° C., intensify and accelerate chemical changes tending to alter the electrical characteristics of the capacitor. Increases in power factor or capacity are especially undesirable as they tend to become progressively intensified, or "runaway" in character.

I have discovered that the presence of a furan alcohol, and in particular tetrahydro furfuryl alcohol, in electrolytic compositions for capacitance devices markedly improves electrical stability of such compositions, particularly at elevated temperatures.

The furfuryl alcohol may be used with various electrolytic compositions, of which several examples are hereinafter given for illustrative purposes. Furfuryl alcohol ($C_4H_3$—$CH_2OH$) is a yellowish liquid having a specific gravity of about 1.13 and a boiling point at atmospheric pressure of about 169° C. It is inflammable, having a flash point of about 75° C. Tetrahydro furfuryl alcohol ($C_4H_7O$—$CH_2OH$) is a water-white liquid having a specific gravity of about 1.05 and a boiling point of about 170-178° C. It also is inflammable, having a flash point of 75° C. Both of these alcohols are good solvents for many organic substances.

Capacitor compositions may be prepared by associating an alcohol of this furan type with an ionogen. Suitable ionogens include the alkali metal derivatives of organic and inorganic acids, such as, for example, the ammonium, sodium, or potassium borates, and phosphates, and the sodium, potassium, or ammonium tartrates, oxalates, and citrates, including Rochelle salt. About two to three parts by weight of the furan alcohol may be used with one part by weight of the ionogen.

The selection and proportion of the ingredients of compositions embodying my invention will vary with the voltage rating and the service requirements of devices embodying my invention. For capacitors to be used on direct current circuits, it has been found that a composition consisting of furfuryl alcohol (for example, 64 parts) and ammonium borate (for example, 36 parts) is satisfactory for voltages as high as 100 to 150 volts. For higher direct current voltages, compositions of tetrahydro furfuryl alcohol (for example, 64 parts) and ammonium borate (for example, 36 parts) advantageously may be used.

However, for many embodiments, whether for use on direct current or alternating current circuits, I prefer to blend the furfuryl or tetrahydro furfuryl alcohol-ammonium borate composition with an amide of an acid containing less than five carbon atoms, as, for example, acetamide. The following examples illustrate preferred compositions, although I do not wish to be limited thereby.

A suitable electrolyte composition may contain by weight 18 per cent of acetamide, 72 per cent tetrahydro furfuryl alcohol and 10 per cent ammonium borate. This mixture may be prepared in a variety of ways:

(a) To a solution containing 80 per cent tetrahydro furfuryl alcohol and 20 per cent acetamide may be added sufficient ammonium borate in crystal form. The addition is preferably made with vigorous agitation while the liquid mixture is maintained at 100° C.

(b) To the liquid mixture containing 80 per cent tetrahydro furfuryl alcohol and 20 per cent acetamide, by weight, boric acid is added. When ammonia gas is introduced at 100° C. (with stirring) reaction occurs until a neutral product is obtained (pH 7). The amount of boric acid is chosen to cause the ammonium borate formed to be equal to about 10 per cent of the total composition.

The electrolytic compositions represented by these examples are substantially clear liquids having a suitably low viscosity for easy and efficient capacitor impregnation at 90° C. The resistivity at 1000 cycles, 90° C. is in the range of 1000 to 1300 ohms per centimeter.

In a prior application, Serial No. 85,520, filed June 16, 1936 (French Patent No. 816,058), I have described and claimed various electrolytic compositions for capacitors containing one or more amides of an aliphatic acid containing less than five carbon atoms in the molecule, such, for example, as acetamide and formamide. An alcohol of the furan type may be added to advantage to the various compositions described in said application.

An electrolytic composition embodying my invention may comprise equal parts by weight of tetrahydro furfuryl alcohol and acetamide combined with from 10 to 40 parts of a suitable ionogen, such as ammonium borate. Still another composition comprises by weight 64 parts of tetrahydro furfuryl alcohol, 20 parts of ammonium borate, and 16 parts of acetamide. The amount of alcohol may be decreased to 40 parts by weight, the amount of acetamide increased to 40 parts, 20 parts of ammonium borate being used. Furfuryl alcohol may be used in place of tetrahydro furfuryl alcohol.

Capacitors rated at 110 volts alternating current, motor starting, are prepared with etched aluminum foil oxidized at 200 volts direct current in an aqueous borate bath in accordance with known methods. A suitable spacing and absorbent material is .001 inch porous tissue, although cheesecloth, kraft crepe paper, or other material having adequate porosity may be used. The capacitor impregnation is preferably carried out by immersing the assembled condenser in the electrolyte at 100° C., for three hours under a nitrogen pressure of 100 pounds, after which the capacitor is cooled to room temperature and sealed in its case, which may be of aluminum or cardboard of the usual type.

Capacitors so prepared are characterized by a capacity corresponding to one microfarad for each one to two square inches of active foil area and a power factor at 110 volts alternating current of less than 8 per cent at 25° C. The power factor of the capacitors is lower at 100° C. than at 25° C., values of less than 7 per cent being obtained. Capacitors so impregnated show no evidence of film deterioration as represented by increased power factor or capacity even after having been heated at 100° C. without voltage for more than 100 days. Indeed, the power factor may decrease. Both initially and after the 100 days' heat treatment, the curing time is zero. The term "curing time" designates the time required upon voltage application for the current to fall below 10 amperes.

What I claim as new and desire to secure by Letters Patent of the United States is:

1. A composition for use in capacitors comprising an alcohol of the furan type and an ionogen.

2. A composition for use in capacitors comprising an ionogen and tetrahydro furfuryl alcohol.

3. An impregnant for capacitors consisting essentially by weight of about 36 parts of ammonium borate and about 64 parts of tetrahydro furfuryl alcohol.

4. A composition adapted for use in capacitors comprising an ionogen, an amide of an aliphatic acid containing less than five carbon atoms in the molecule, and furfuryl alcohol.

5. A composition adapted for use in electrolytic capacitors comprising as essential ingredients an ionogen, acetamide, and tetrahydro furfuryl alcohol.

6. An electrolyte impregnant for capacitance devices consisting essentially by weight of 10 to 40 parts of ammonium borate, 16 to 20 parts of acetamide, and 40 to 80 parts of tetrahydro furfuryl alcohol.

7. A capacitor electrolyte comprising as essential ingredients ammonium borate, acetamide and tetrahydro furfuryl alcohol.

FRANK M. CLARK.